United States Patent  (10) Patent No.: US 8,155,118 B2
Jorgensen et al.  (45) Date of Patent: Apr. 10, 2012

(54) MIRRORING OF A RANDOM SUBSET OF NETWORK TRAFFIC

(75) Inventors: Steven Glen Jorgensen, Newcastle, CA (US); Jonathan Edward Greenlaw, Roseville, CA (US); Alan R. Albrecht, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1725 days.

(21) Appl. No.: 11/208,330

(22) Filed: Aug. 19, 2005

(65) Prior Publication Data

US 2007/0041332 A1 Feb. 22, 2007

(51) Int. Cl.
*H04L 12/56* (2006.01)

(52) U.S. Cl. .................................. 370/390; 370/252

(58) Field of Classification Search .................. 370/360, 370/390, 392, 241, 409, 395, 359, 253, 244, 370/60, 229, 389; 707/3; 395/200; 709/224
See application file for complete search history.

(56) References Cited

U.S. PATENT DOCUMENTS

| | | | | |
|---|---|---|---|---|
| 4,829,227 A | * | 5/1989 | Turner | 370/422 |
| 5,790,799 A | * | 8/1998 | Mogul | 709/224 |
| 5,890,150 A | * | 3/1999 | Ushijima et al. | 707/3 |
| 6,041,042 A |  | 3/2000 | Bussiere | |
| 6,310,860 B1 |  | 10/2001 | Sheu et al. | |
| 6,324,654 B1 |  | 11/2001 | Wahl et al. | |
| 6,618,818 B1 |  | 9/2003 | Wahl et al. | |
| 6,714,977 B1 |  | 3/2004 | Fowler et al. | |
| 7,031,304 B1 | * | 4/2006 | Arberg et al. | 370/360 |
| 7,206,310 B1 | * | 4/2007 | Chen et al. | 370/389 |
| 7,313,100 B1 | * | 12/2007 | Turner et al. | 370/253 |
| 2002/0075809 A1 | * | 6/2002 | Phaal | 370/245 |
| 2004/0170176 A1 | * | 9/2004 | Kadambi et al. | 370/392 |
| 2005/0190695 A1 | * | 9/2005 | Phaal | 370/229 |

* cited by examiner

*Primary Examiner* — Kwang B Yao
*Assistant Examiner* — Syed M Bokhari

(57) ABSTRACT

One embodiment disclosed relates to a method of mirroring network traffic. A data packet is received by a network device, and an algorithm including randomization is applied to determine whether the data packet is selected to be mirrored. The packet is sent to a destination port, and if the data packet is selected to be mirrored, then the packet is also sent to a mirror port. Another embodiment of the invention relates to a networking device. The networking device includes at least a plurality of ports, a switching/routing engine, and a mirroring engine. The plurality of ports receive and transmit packets therefrom, and the switching/routing engine is coupled to the ports for transferring the packets therebetween. The mirroring engine is configured to apply an algorithm including randomization to select data packets for mirroring. Other embodiments are also disclosed.

15 Claims, 3 Drawing Sheets

MIRRORING OF A RANDOM SUBSET OF NETWORK TRAFFIC

BACKGROUND OF THE INVENTION

1. Field of the Invention

The present invention relates generally to networking and communications technology.

2. Description of the Background Art

Network traffic mirroring (or monitoring) is a process by which network traffic is sent to a mirror (or monitor) port or interface, in addition to the intended destination of the traffic. A network monitoring device or network analyzer may be attached to the mirror port/interface to detect problems in the network.

It is desirable to improve networking and communications technology. In particular, it is desirable to improve apparatus and methods of mirroring network traffic.

SUMMARY

One embodiment disclosed relates to a method of mirroring network traffic. A data packet is received by a network device, and an algorithm including randomization is applied to determine whether the data packet is selected to be mirrored. The packet is sent to a destination port, and if the data packet is selected to be mirrored, then the packet is also sent to a mirror port.

Another embodiment of the invention relates to a networking device. The networking device includes at least a plurality of ports, a switching/routing engine, and a mirroring engine. The plurality of ports receive and transmit packets therefrom, and the switching/routing engine is coupled to the ports for transferring the packets therebetween. The mirroring engine is configured to apply an algorithm including randomization to select data packets for mirroring.

Other embodiments are also disclosed.

DETAILED DESCRIPTION

One typical problem with conventional apparatus and methods for mirroring network traffic relates to the fact that conventional mirroring logic does not anticipate the port speed or capacity of the monitoring device. As such, the mirroring device may send more packets to the monitoring device than the monitoring device can handle.

When the input buffer of the monitoring device overflows due to the receipt of too many mirrored packets, the monitoring device may drop packets without regard to their importance or ordering. This may cause the monitoring device to obtain poorly distributed subsets of the data traffic that it wants to monitor.

As described herein, randomized selection of packets to be mirrored provides an advantageous solution to the above-discussed problem. The randomized selection allows the monitoring device to receive a well distributed subset of the traffic that is desired to be monitored.

Other solutions may utilize sampling which is configured to be stricter than the random sampling of the present disclosure. As a simple example, the sampling may be configured such that only every tenth packet is mirrored. However, such stricter sampling of packets to be mirrored may result in a poorly distributed subset of the network traffic that is desired to be monitored. Such a poorly distributed subset of packets may have undesirable biases which skew packet statistics. In contrast, a random sampling of packets, in accordance with this disclosure, will provide a well-distributed sampling of packets and hence more reliable packet statistics.

Figure 1:
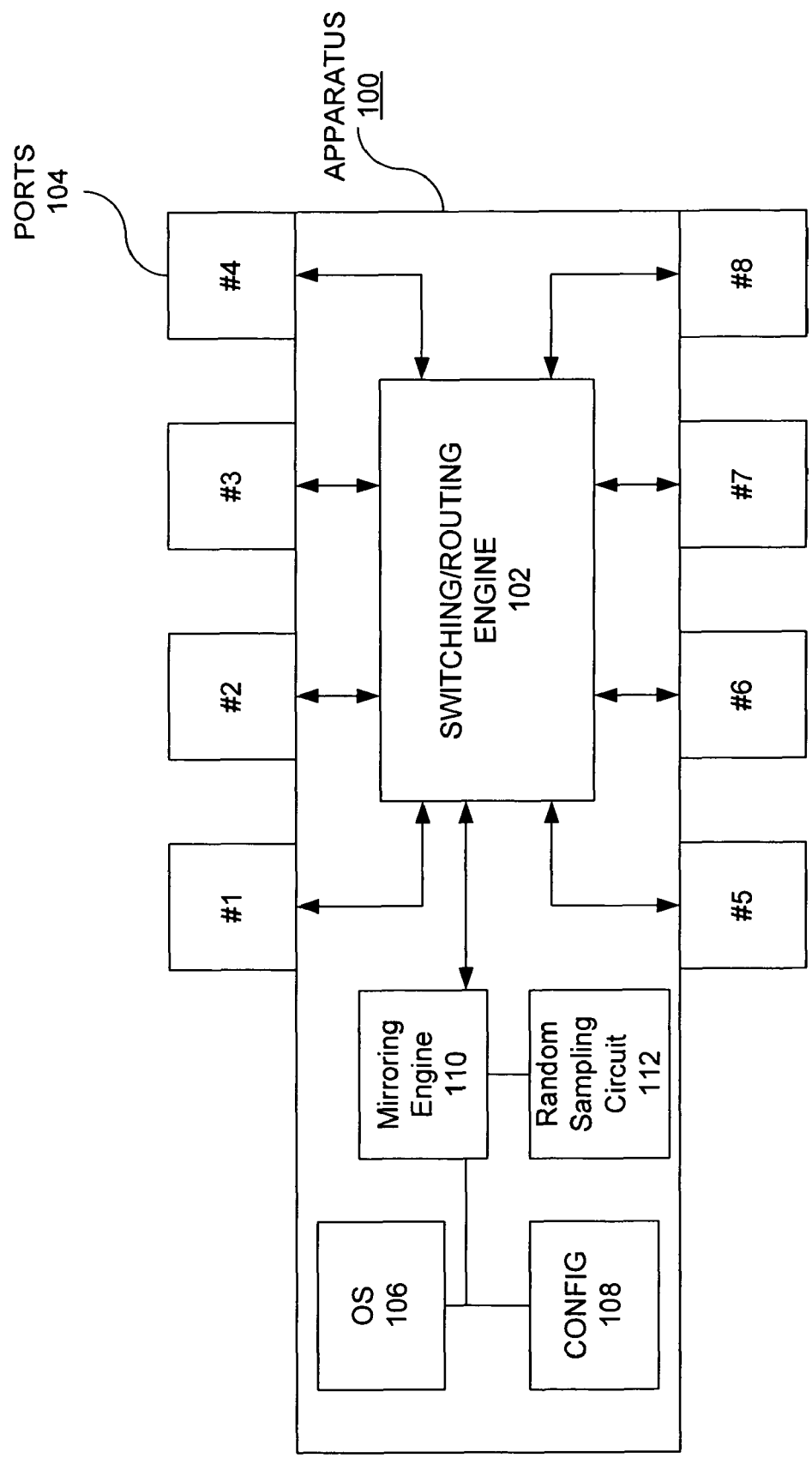
FIG. 1 is a schematic diagram illustrating a networking apparatus in accordance with an embodiment of the invention.

FIG. 1 is a schematic diagram illustrating a networking apparatus in accordance with an embodiment of the invention. The apparatus 100 includes a switching or routing (switching/routing) engine 102, a plurality of switch ports 104, an operating system (OS) 106, data stored in a configuration file 108, and a mirroring engine 110.

The switching/routing engine 102 is coupled to each of the ports 104. The switching/routing engine may include, for example, a switching core such as a crossbar switch or other circuitry, and makes connections between the ports 104 so that data frames can be transferred from one port to another port. Eight switch ports 104 are shown in this example. The ports 104 are shown as numbered, for example, as #1, #2, #3, #4, #5, #6, #7, and #8. Of course, other implementations may include any number of ports.

The OS 106 includes software routines used to control the operation of the switch 100. The configuration file 108 includes configuration information utilized by the OS 106. For example, the configuration file 108 may include selection criteria or selection parameters for packet mirroring.

In accordance with an embodiment of the invention, the mirroring engine 110 is configured to apply an algorithm including randomization to select data packets to be mirrored. The randomization may be implemented, for example, using a random sampling (pseudo-random selector) circuit 112 coupled to the mirroring engine 110. The random sampling circuit 112 may be configured to randomly return a signal indicating whether or not a particular packet is to be mirrored. Those data packets which are randomly selected for mirroring are sent to a monitoring port, in addition to being sent to the appropriate destination port.

Figure 2:
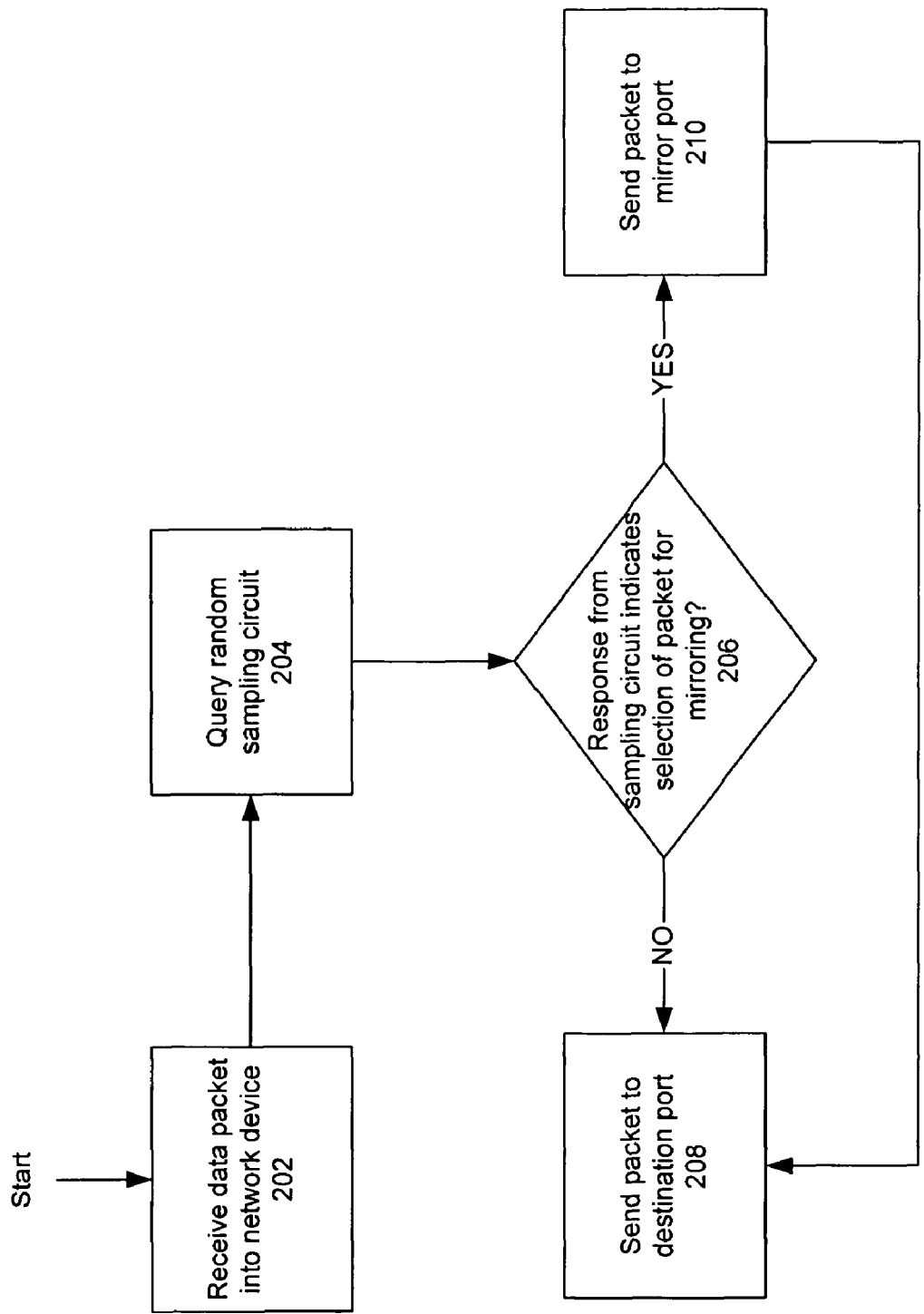
FIG. 2 is a flow chart depicting a method of mirroring a random subset of network traffic in accordance with an embodiment of the invention.

FIG. 2 is a flow chart depicting a method 200 of mirroring a random subset of network traffic in accordance with an embodiment of the invention. This method 200 starts when a data packet is received 202 into the network device. The network device may comprise, for example, a networking apparatus 100 as described above in relation to FIG. 1, or may comprise an alternative networking device, such as a different switch, router, hub, or similar device.

For each packet received, a random sampling circuit 112 may be queried 204. A response 206 from the sampling circuit 112 then indicates whether or not this packet is selected for mirroring. Other embodiments may achieve the randomized selection by other techniques.

If the random selection results in the packet not being selected for mirroring, then the packet is simply sent (switched or routed) 208 to the appropriate destination port. The destination port being determined, for example, based on a destination address in the packet, as is known to those of skill in the art.

On the other hand, if the random selection results in the packet being selected for mirroring, then a copy of the packet is sent 210 to a pre-designated mirror (or monitor) port of the networking device. In addition, the packet is also sent (switched or routed) 208 to the appropriate destination port.

Figure 3:
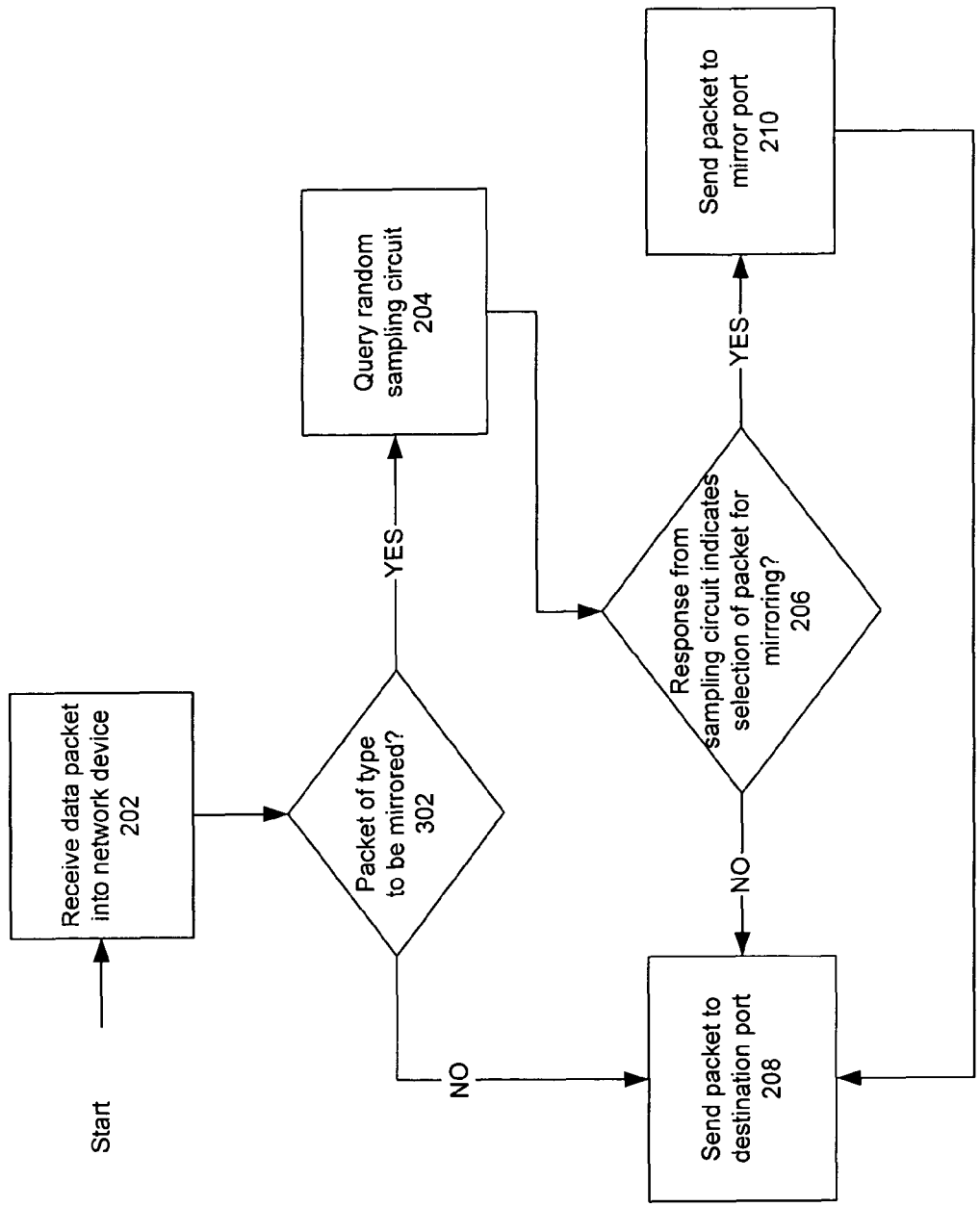
FIG. 3 is a flow chart depicting a method of mirroring a random subset of network traffic depending upon the type (or "monitoring class") of packets in accordance with an embodiment of the invention.

FIG. 3 is a flow chart depicting a method 300 of mirroring a random subset of network traffic depending upon the type (or "monitoring class") of packets in accordance with an embodiment of the invention. The method 300 of FIG. 3 is similar to the method 200 of FIG. 2.

However, after the data packet is received 202 in the network device, a determination 302 is made as to the whether the packet is of a "type" (or "monitoring class") that is designated to be mirrored (or monitored). The types of packets to be mirrored may be specified, for example, in a configuration file 108. For example, packets from a certain port or certain ports of the device (but not other ports) may be designated to be mirrored. As another example, multi-cast packets (but not unicast packets) may be designated to be mirrored.

If the packet is not of a type to be mirrored, then the packet may be simply sent 208 to the appropriate destination port. On the other hand, if the packet is of a type to be mirrored, then the process 300 would move on to perform the randomized selection (for example, by query to 204 and response from 206 a sampling circuit 112).

In one specific embodiment, the randomized selection may be weighted (i.e. have a different probability of selection) depending upon the type or "monitoring class" of the packet. In other words, each monitoring class may have a corresponding weight indicating a different fraction or percentage of packets to be randomly sent to the mirroring port. The different weights may be implemented using different sampling circuits or by a sampling circuit that is configurable to different probabilities of selection. The weight is effectively zero if that type of packets is not to be mirrored. This embodiment may be advantageously utilized to weight one class of packets more heavily than another class of packets in the mirrored network traffic.

The above-disclosed techniques avoid the above-discussed problems due to too many packets being mirrored to a monitoring device. In particular, the poorly distributed subsets of network traffic may be avoided by the randomized sampling (or weighted randomized sampling) performed in accordance with embodiments of the invention. The apparatus and methods disclosed herein allow a programmer to obtain a well distributed random subset of the traffic that is desired to be mirrored (monitored). The subset of mirrored traffic may be weighted per configurable monitoring classes such that one class of packets may be weighted more heavily than another class of packets in the mirrored network traffic.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of mirroring network traffic, the method comprising:
   receiving a data packet by a network device;
   categorizing the data packet into one of a plurality of monitoring classes, wherein each of the plurality of monitoring classes identifies a different type of data packet, wherein at least one of the plurality of monitoring classes is to be mirrored and at least another one of the plurality of monitoring classes is not to be mirrored, and wherein at least one of the plurality of monitoring classes has a different probability of being randomly selected for mirroring than at least another one of the plurality of monitoring classes;
   in response to a determination that the data packet is categorized into a monitoring class to be mirrored, applying an algorithm including randomization to determine whether the data packet is selected to be mirrored, wherein the probability that the data packet is selected to be mirrored is based upon the monitoring class into which the data packet is categorized;
   sending the data packet to a destination port; and
   if the data packet is selected to be mirrored, then also sending the data packet to a mirror port.

2. The method of claim 1, further comprising applying the algorithm only if the packet is categorized into a monitoring class to be mirrored.

3. The method of claim 1, wherein applying the algorithm including randomization further comprises applying the algorithm including randomization to cause each monitoring class of the plurality of monitoring classes to be mirrored to have an independently-configurable probability of random selection for mirroring.

4. The method of claim 1, wherein categorizing the data packet into one of the plurality of monitoring classes further comprises examining a value of at least a portion of the data packet and categorizing the data packet into one of the plurality of monitoring classes based on the value.

5. The method of claim 1, wherein categorizing comprises categorizing the data packet into a first one of the monitoring classes of the plurality of monitoring classes if the data packet is addressed to a single destination and associating the data packet with a second one of the monitoring classes of the plurality of monitoring classes if the packet is addressed to multiple destinations.

6. The method of claim 1 wherein the data packet comprises a first data packet and further comprising:
   receiving a second data packet by the network device;
   randomly determining that the second data packet is not selected to be mirrored; and
   sending the second data packet to the destination port without sending the second data packet to the mirror port.

7. A networking device comprising: a plurality of ports for receiving and transmitting packets therefrom; a switching/routing engine coupled to the ports for transferring the packets there between; and a mirroring engine to categorize the packets into one of a plurality of monitoring classes, wherein each of the plurality of monitoring classes identifies a different type of packet, wherein at least one of the plurality of monitoring classes is to be mirrored and at least another one of the plurality of monitoring classes is not to be mirrored, wherein at least one of the plurality of monitoring classes has a different probability of being randomly selected for mirroring than at least another one of the plurality of monitoring classes, and to apply an algorithm including randomization to randomly select a subset of the packets categorized into a monitoring class to be mirrored for mirroring, wherein the probability that the data packet is selected to be mirrored is based upon the monitoring class into which the data packet is categorized, wherein some of the packets do not belong to the subset.

8. The networking device of claim 7, wherein the networking device is configured to determine whether the packets of the subset are of a type to be mirrored prior to including the packets of the subset in the subset.

9. The networking device of claim 7, wherein each monitoring class of the plurality of monitoring classes to be mirrored has an independently-configurable probability of random selection for mirroring.

10. The networking device of claim 7, wherein the mirroring engine is further to mirror only the selected subset of the packets and not mirror the unselected packets.

11. An apparatus for mirroring of network traffic, the method comprising:
- a plurality of ports configured to receive and send data packets;
- means for categorizing the data packets into one of a plurality of monitoring classes, wherein each of the plurality of monitoring classes identifies a different type of data packet, wherein at least one of the plurality of monitoring classes is to be mirrored and at least another one of the plurality of monitoring classes is not to be mirrored, and wherein at least one of the plurality of monitoring classes has a different probability of being randomly selected for mirroring than at least another one of the plurality of monitoring classes;
- means for applying an algorithm including randomization to determine whether a data packet that has been categorized into a monitoring class to be mirrored is selected to be mirrored, wherein the probability that the data packet is selected to be mirrored is based upon the monitoring class into which the data packet is categorized; and
- means for sending the data packet to a destination port and for sending the data packet to a monitoring port if the data packet is selected to be mirrored.

12. A networking device comprising: a plurality of ports including a receiving port configured to receive a plurality of packets, one or more destination ports, and a mirror port; and circuitry to forward the packets of the plurality to the destination ports, to categorize the packets into one of a plurality of monitoring classes, wherein each of the plurality of monitoring classes identifies a different type of packet, wherein at least one of the plurality of monitoring classes is to be mirrored and at least another one of the plurality of monitoring classes is not to be mirrored, wherein at least one of the plurality of monitoring classes has a different probability of being randomly selected for mirroring than at least another one of the plurality of monitoring classes, and to apply an algorithm including randomization to randomly select a subset of packets from the plurality of packets categorized into a monitoring class to be mirrored for mirroring, wherein the probability that the data packet is selected to be mirrored is based upon the monitoring class into which the data packet is categorized, and to forward the selected subset of packets to the mirror port, wherein some of the packets of the plurality do not belong to the subset.

13. The device of claim 12 wherein the circuitry is further configured to not forward packets of the plurality not belonging to the subset to the mirror port.

14. The device of claim 12 wherein at least one of the packets of the subset is a packet addressed to only a single destination.

15. The device of claim 12 wherein at least one of the packets of the subset does not comprise an indicator specifying that the packet is to be sent to more than one destination.

* * * * *